United States Patent
Grizante Redondo et al.

(12) 
(10) Patent No.: US 6,924,031 B2
(45) Date of Patent: Aug. 2, 2005

(54) LOW-SMOKE SELF-EXTINGUISHING ELECTRICAL CABLE AND FLAME-RETARDANT COMPOSITION USED THEREIN

(75) Inventors: Eduardo Grizante Redondo, Monza (IT); Franco Peruzzotti, Legnano (IT); Diego Tirelli, Sesto San Giovanni (IT); Enrico Albizzati, Lesa (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 253 days.

(21) Appl. No.: 09/815,311

(22) Filed: Mar. 23, 2001

(65) Prior Publication Data

US 2002/0001715 A1 Jan. 3, 2002

Related U.S. Application Data

(63) Continuation of application No. PCT/EP99/06910, filed on Sep. 17, 1999.
(60) Provisional application No. 60/102,926, filed on Oct. 1, 1998.

(30) Foreign Application Priority Data

Sep. 25, 1998 (EP) ............................................. 98118194

(51) Int. Cl.$^7$ .............................. D02G 3/00; H01B 7/00
(52) U.S. Cl. ...................... 428/372; 428/375; 428/379; 428/383; 428/389; 174/110 PM; 174/110 A; 174/120 SR; 427/117; 427/118; 524/364; 525/232; 525/240
(58) Field of Search ......................... 524/436; 525/232, 525/240; 174/110 A, 110 PM, 120 SR, 121 A; 428/383, 389, 372, 379, 375; 427/117, 118

(56) References Cited

U.S. PATENT DOCUMENTS

| | | | |
|---|---|---|---|
| 4,098,762 | A | 7/1978 | Miyata et al. |
| 4,145,404 | A | 3/1979 | Miyata et al. |

(Continued)

FOREIGN PATENT DOCUMENTS

| | | |
|---|---|---|
| DE | 36 33 056 A | 4/1988 |
| EP | 0 342 750 | 11/1989 |

(Continued)

OTHER PUBLICATIONS

*DuPont Industrial Polymers: Fusabond®*, http://www.dupont.com/industrial–polymers/fusabond/H–81624/H–81624.html.

(Continued)

*Primary Examiner*—Rena Dye
*Assistant Examiner*—J. M. Gray
(74) *Attorney, Agent, or Firm*—Finnegan, Henderson, Farabow, Garrett & Dunner, L.L.P.

(57) ABSTRACT

Self-extinguishing cable coated with a flame-retardant composition having: (a) an ethylene homopolymer or copolymer having a density of from 0.905 to 0.970 g/cm$^3$, and being selected from: ethylene homopolymers: copolymers of ethylene with an alpha-olefin; copolymers of ethylene with an ethylenically unsaturated ester; or mixtures thereof; (b) a copolymer of ethylene with at least one alpha-olefin, and optionally with a diene, said copolymer (b) having a density of from 0.860 to 0.904 g/cm$^3$, and having a composition distribution index greater than 45%; (c) natural magnesium hydroxide in an amount such as to impart flame-retardant properties; wherein at least one of the polymeric components (a) and (b) contains hydrolyzable organic silane groups grafted onto the polymer chain. The silane groups are preferably introduced during compounding of the flame-retardant composition by adding to the polymer mixture a suitable silane compound and a radical initiator.

15 Claims, 1 Drawing Sheet

U.S. PATENT DOCUMENTS

Figure 1:
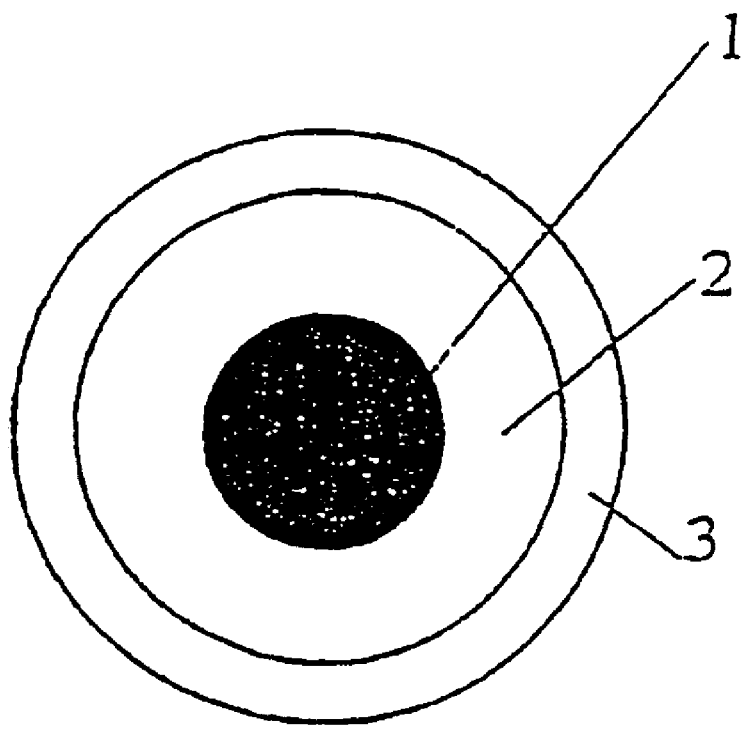

| | | | |
|---|---|---|---|
| 4,939,181 A | | 7/1990 | Haselier |
| 5,008,204 A | | 4/1991 | Stehling |
| 5,066,725 A | | 11/1991 | Haselier |
| 5,139,875 A | * | 8/1992 | Metzemacher et al. ..... 428/403 |
| 5,229,478 A | | 7/1993 | Floyd et al. |
| 5,246,783 A | | 9/1993 | Spenadel et al. |
| 5,272,236 A | | 12/1993 | Lai et al. |
| 5,414,040 A | | 5/1995 | McKay et al. |
| 5,707,732 A | | 1/1998 | Sonoda et al. |
| 6,043,306 A | * | 3/2000 | Imahashi ..................... 524/436 |
| 6,262,161 B1 | * | 7/2001 | Betso et al. ................. 524/425 |
| 6,552,112 B1 | * | 4/2003 | Redondo et al. ............ 524/436 |

FOREIGN PATENT DOCUMENTS

| | | |
|---|---|---|
| EP | 0 416 815 A1 | 3/1991 |
| EP | 0 418 044 B1 | 3/1991 |
| EP | 0 632 065 A1 | 1/1995 |
| EP | 0 780 425 A1 | 6/1997 |
| JP | 1-294792 | 11/1989 |
| JP | 3-231944 | 10/1991 |
| JP | 5-17692 | 1/1993 |
| WO | WO 93/18107 | 9/1993 |
| WO | WO 99/05688 | 2/1999 |

OTHER PUBLICATIONS

Bernt–Ake Sultan et al., *A Review of Fifteen Years Development in Moisture Curable Copolymers and a Future Outlook*, http://www.borealisgroup.com/public/pdf/customer_centre/WC_Mumbai2002_Visico.pdf.

Definition of "appreciable", Merriam–Webster's Collegiate Dictionary, 57, (10th ed. 1993).

Wild, L. et al., "Determination of Branching Distributions in Poly ethylene and Ethylene Copolymers", Journal of Polymer Science: Polymer Physics Edition, vol. 20, pp. 441–455, (1982).

Möhring, P.C. et al., "Homogeneous Group 4 Metallocene Ziegler–Natta Cataly sts: The Influence of Cyclopentadienyl–Ring Substituents", Journal of Organometallic Chemistry, vol. 479, Nos. 1–2, pp. 1–29, (1994).

Gupta, V. et al., "Metalocene Complexes of Group 4 Elements in the Polymerization of Monoolefins", Journal of Macromolecular Science—Reviews in Macromolecular Chemistry and Physics, vol. C34, No. 3, pp. 439–514, (1994).

* cited by examiner

LOW-SMOKE SELF-EXTINGUISHING ELECTRICAL CABLE AND FLAME-RETARDANT COMPOSITION USED THEREIN

This application is a continuation of International Application No. PCT/EP99/06910, filed Sep. 17, 1999, and claims the priority of EP98118194.4, filed Sep. 25, 1998; and the benefit of U.S. Provisional application No. 60/102,926, filed Oct. 1, 1998, the content of all of which is incorporated herein by reference.

The present invention relates to electrical cables, in particular for low-voltage energy distribution or for telecommunications, these cables having low-smoke self-extinguishing properties, and to the flame-retardant compositions used therein.

Self-extinguishing electrical cables can be produced having a flame-retardant coating made from a polymer composition to which fire-resistant properties have been given by adding a suitable additive. Polyolefin-based compositions based, for example, on polyethylene or ethylene/vinyl acetate copolymers, containing an organic halide combined with antimony trioxide as flame-retardant additive can, for example, be used for this purpose. However, halogenated flame-retardant additives have many drawbacks since they partially decompose during processing of the polymer, giving rise to halogenated gases that are toxic to workers and corrode metal parts of the polymer-processing equipment. In addition, when they are placed directly in a flame, their combustion gives rise to large amounts of fumes containing toxic gases. Similar drawbacks are encountered when polyvinylchloride (PVC) supplemented with antimony trioxide is used as base polymer.

Therefore, in recent years the production of self-extinguishing cables has been directed toward halogen-free compositions, using as flame-retardant filler inorganic oxides, preferably in hydrate or hydroxide form, in particular magnesium hydroxide or aluminium hydroxide.

Aluminium hydroxide starts to decompose at a relatively low temperature (about 190° C.), which can result in various drawbacks during extrusion of the polymer composition, with formation of bubbles and defects in the final product. Therefore, the use of aluminium hydroxide as flame retardant is generally limited to polymer materials which do not require high processing temperatures. In contrast, magnesium hydroxide has a decomposition temperature of about 340° C. and is characterized by greater heat stability and a high decomposition enthalpy. These properties make magnesium hydroxide particularly suitable as flame retardant filler in polymer compositions for coating cables, which require high extrusion temperatures and a small number of morphological defects.

However, the use of magnesium hydroxide as a flame-retardant filler does have certain drawbacks. Firstly, in order to obtain an efficient flame-retardant effect, very large amounts of magnesium hydroxide must be added to the polymer material, generally about 120–250 parts by weight relative to 100 parts by weight of polymer material. Such high levels of filler lead to a reduction in processability and in mechanical and elastic properties of the resulting mixture, in particular as regards impact resistance, elongation and stress at break.

In U.S. Pat. No. 4,145,404 these drawbacks are attributed to the low affinity of natural magnesium hydroxide, obtained for example by grinding minerals such as brucite, with the polymer material, in particular when the polymer is of low polarity, as in the case of polyolefins.

In patent EP-780,425 it is pointed out that the presence of different metal impurities, such as iron or manganese salts, in magnesium hydroxide of natural origin causes degradation of the polymer matrix into which magnesium hydroxide is dispersed.

Therefore, research efforts have been directed towards modifying properties of magnesium hydroxide to improve its compatibility with the polymer matrix and its degree of purity. Various synthetic methods have thus been developed in which magnesium hydroxide is produced by adding alkalis to an aqueous solution of a soluble salt thereof and subsequent precipitation of the hydroxide by heating at high pressure (see for example U.S. Pat. No. 4,098,762 or the above-mentioned patents EP-780,425 and U.S. Pat. No. 4,145,404). In this way, a magnesium hydroxide is obtained with a high degree of purity and high structural uniformity with formation of crystallites of flattened hexagonal shape with an average diameter not greater than 2 $\mu$m and a specific surface area, measured by BET method, not greater than 20 $m^2/g$.

However, the use of synthetic magnesium hydroxide as flame-retardant filler has a considerable impact on the cost of the finished product, so as to make flame-retardant systems based on magnesium hydroxide non-competitive when compared with the halogen-containing flame-retardant compositions described above.

In certain cases attempts have been made to improve properties of natural magnesium hydroxide by using suitable grinding and/or surface treatment processes, as disclosed, e.g., in Japanese patent applications (Kokai) JP-01-294792, JP-03-231-994 and JP-05-17692. In all of these Japanese patent applications, natural magnesium hydroxide is combined with the polyolefins commonly employed for flame-retardant compositions, such as ethylene/vinyl acetate (EVA) copolymers, ethylene/ethyl acrylate (EEA) copolymers, or ultra-low density polyethylene (ULDPE) obtained by copolymerization of ethylene with an alpha-olefin in the presence of a conventional Ziegler-Natta catalyst based on titanium and/or vanadium compounds.

In U.S. Pat. No. 5,707,732 an electrical or telecommunications cable is disclosed, which is coated with a flame-retardant composition comprising 100 parts by weight of a resin mixture and from 5 to 250 parts by weight of a flame-retardant filler. The filler is either magnesium hydroxide or aluminium trihydrate, while the resin mixture consists of: (i) a polyethylene made using a metallocene single-site catalyst system and having an $M_w/M_n$ ratio not greater than about 3; (ii) a polyethylene made using a transition metal catalyst other than a metallocene single-site catalyst system and having an $M_w/M_n$ ratio greater than about 4; and optionally (iii) a copolymer of ethylene and an unsaturated ester or a very low density polyethylene having a density not greater than 0.915 $g/cm^3$; wherein resins (i) or (ii) are modified with an unsaturated aliphatic diacid anhydride through grafting or copolymerization.

In European patent application No. 97121042.2, filed on Jan. 12, 1997 by the Applicant, and in the paper published in the Research Disclosure issue of March 1998, No. 407, low-smoke self-extinguishing cables are disclosed, which are coated with a flame-retardant composition comprising natural magnesium hydroxide as flame-retardant filler and, as polymeric components, a copolymer of ethylene with an alpha-olefin, and optionally with a diene, having a uniform distribution of the alpha-olefin among the copolymer molecules, and a crystalline propylene homopolymer or copolymer. These compositions allows to produce cables which combine a high flame-resistance with good mechanical properties. Particularly, the ethylene/alpha-olefin copolymer as defined above improves incorporation and dispersion of the mineral filler into the polymer matrix, while the presence of crystalline propylene homopolymers or copolymers enhances thermocompression resistance of the cable.

The Applicant has now realized that the self-extinguishing cables disclosed in European patent application No. 97121042.2, while showing excellent mechanical properties, particularly as to stress at break and thermocompression resistance, show reduced flexibility, particularly in terms of elongation at break and modulus. This shortcoming is particularly evident when large amounts of natural magnesium hydroxide are to be incorporated into the polymer matrix. This makes difficult to comply with those specifications for self-extinguishing cables which, in some countries, require very high values of Limited Oxygen Index (LOI), generally of at least 35, measured on compression moulded plates according to ASTM Standard D-2863.

To solve the above problem, the Applicant has found that very high values of LOI and good mechanical properties combined with excellent flexibility may be obtained by using natural magnesium hydroxide as flame-retardant filler and, as polymer matrix, a polymeric mixture comprising an ethylene homopolymer or copolymer having a density of from 0.905 to 0.970 g/cm$^3$, and a copolymer of ethylene with an alpha-olefin, and optionally with a diene, having a density of from 0.860 to 0.904 g/cm$^3$ characterized by a uniform distribution of the alpha-olefin units among the copolymer molecules as defined hereinbelow. To achieve a uniform and effective compatibilization of natural magnesium hydroxide with the polymer matrix, at least one of the above polymeric components contains hydrolyzable organic silane groups grafted onto the polymer chain.

As better described below, the silane groups are preferably introduced during compounding of the flame-retardant composition by adding to the polymer mixture a suitable silane compound and a radical initiator. Alternatively, the silane groups may be provided by adding a polyolefin already containing hydrolyzable organic silane groups.

The Applicant has found that, in the compositions according to the present invention, compatibilization of the natural filler with the polymer matrix is particularly effective when using, instead of carboxyl groups deriving from an unsaturated aliphatic diacid anhydride (particularly, maleic anhydride) as disclosed in U.S. Pat. No. 5,707,732, organic silane groups containing at least one hydrolyzable moiety. The Applicant believes the hydrolyzable organic silane groups give a more effective interaction between natural magnesium hydroxide and polyethylene polymers with a uniform distribution of the filler into the polymer matrix, thus achieving better mechanical properties even with large amounts of filler (of at least 180 phr or more). By suitably dosing the amount of the silane groups, this performance is achieved without causing an appreciable cross-linking of the polymer matrix, which keeps its thermoplastic properties after deposition onto the cable core. This allows ease of recycle for the cable coating.

Moreover, if compared to unsaturated aliphatic diacid anhydrides, organic silanes, being less reactive, can be easily dosed during compounding without causing an undesirable increase of viscosity in the molten polymer mixture, thus avoiding difficulties of mixing and non-homogeneous dispersion of the compound ingredients. These are remarkable advantages when using natural magnesium hydroxide as flame-retardant filler, whose irregular morphology makes its processing laborious and troublesome.

Therefore, according to a first aspect, the present invention relates to a self-extinguishing cable comprising a conductor and a flame-retardant coating, characterized in that the said flame-retardant coating comprises:

(a) an ethylene homopolymer or copolymer having a density of from 0.905 to 0.970 g/cm$^3$, preferably from 0.910 to 0.940 g/cm$^3$, and being selected from: ethylene homopolymers; copolymers of ethylene with an alpha-olefin; copolymers of ethylene with an ethylenically unsaturated ester; or mixtures thereof;

(b) a copolymer of ethylene with at least one alpha-olefin, and optionally with a diene, said copolymer (b) having a density of from 0.860 to 0.904 g/cm$^3$ preferably from 0.865 to 0.902 g/cm$^3$, and being characterized by a composition distribution index greater than 45%, said index being defined as the weight percentage of copolymer molecules having an alpha-olefin content within 50% of the average total molar content of alpha-olefin;

(c) natural magnesium hydroxide in an amount such as to impart flame-retardant properties;

wherein at least one of the polymeric components (a) and (b) contains hydrolyzable organic silane groups grafted onto the polymer chain.

According to a second aspect, the present invention relates to a flame-retardant composition comprising:

(a) an ethylene homopolymer or copolymer having a density of from 0.905 to 0.970 g/cm$^3$, preferably from 0.910 to 0.940 g/cm$^3$, and being selected from: ethylene homopolymers; copolymers of ethylene with an alpha-olefin; copolymers of ethylene with an ethylenically unsaturated ester; or mixtures thereof;

(b) a copolymer of ethylene with at least one alpha-olefin, and optionally with a diene, said copolymer (b) having a density of from 0.860 to 0.904 g/cm$^3$ preferably from 0.865 to 0.902 g/cm$^3$, and being characterized by a composition distribution index greater than 45%, said index being defined as the weight percentage of copolymer molecules having an alpha-olefin content within 50% of the average total molar content of alpha-olefin;

(c) natural magnesium hydroxide in an amount such as to impart flame-retardant properties;

wherein at least one of the polymeric components (a) and (b) contains hydrolyzable organic silane groups grafted onto the polymer chain.

In a further aspect, the present invention relates to a method for producing a self-extinguishing cable, said method comprising the following steps: (1) preparing a polymer mixture having flame-retardant properties; (2) extruding said mixture on a conductor optionally pre-coated with an insulating layer, characterized in that step (1) comprises mixing a polymer matrix with a predetermined amount of natural magnesium hydroxide, and further adding a radical initiator and an organic silane compound containing at least one hydrolyzable group and at least one ethylenically unsaturated hydrocarbon group, in order to obtain grafting of hydrolyzable organic silane groups onto the polymer chains;

said polymer matrix comprising:

(a) an ethylene homopolymer or copolymer having a density of from 0.905 to 0.970 g/cm$^3$, and being selected from: ethylene homopolymers; copolymers of ethylene with an alpha-olefin; copolymers of ethylene with an ethylenically unsaturated ester; or mixtures thereof;

(b) a copolymer of ethylene with at least one alpha-olefin, and optionally with a diene, said copolymer (b) having density of from 0.860 to 0.904 g/cm$^3$, and being characterized by a composition distribution index greater than 45%, said index being defined as the weight percentage of copolymer molecules having an alpha-olefin content within 50% of the average total molar content of alpha-olefin.

The composition distribution index provides an indication of the distribution of the alpha-olefin among the copolymer molecules (the higher the value of this index, the more homogeneous the distribution of the comonomer among the copolymer molecules), and can be determined by Temperature Rising Elution Fractionation, as described, for example, in U.S. Pat. No. 5,008,204 or in Wild et al., *J. Poly. Sci. Poly. Phys. Ed.*, Vol. 20, p. 441 (1982).

The use of polymeric components (a) and (b) as defined above allows to obtain a thermoplastic coating which combines satisfactory tensile properties with excellent flexibility particularly in highly filled coatings. At the same time, thermocompression resistance of the coating even at the maximum cable operating temperature is sufficently high to pass the thermocompression test described in CEI standard 20-34/3-1. This test consists in subjecting the coating of a cable specimen to a predetermined compression at a predetermined temperature and for a predetermined time. At the end of the test, the flattening degree of the coating, expressed as percentage of the residual thickness relative to the initial thickness of the coating, is measured: the sample passes the test if its residual thickness is greater than 50% of its initial thickness.

As indicated above, the silane groups are preferably grafted onto the polymer chains during compounding of the flame-retardant composition. The grafting may be carried out by adding to the polymer mixture a radical initiator and an organic silane compound containing at least one hydrolyzable group and at least one ethylenically unsaturated hydrocarbon group.

Organic silane compounds suitable for this purpose may be selected, e.g., from the compounds of formula RR'SiY$_2$, wherein R is an ethylenically unsaturated hydrocarbon group, Y is a hydrolyzable organic group, and R' is a saturated hydrocarbon group or is the same as Y. Preferably, Y is an alkoxy group having from 1 to 16 carbon atoms, such as methoxy, ethoxy, propoxy, hexoxy, dodecoxy, methoxyethoxy, and the like; R is a vinyl, allyl, acryl, methacryl, acryloxyalkyl or methacryloxyalkyl group.

Examples of suitable organic silanes are the following:
γ-methacryloxypropyl-trimethoxysilane,
allyltrimethoxysilane,
vinyl-tris(2-methoxyethoxy)silane,
vinyltrimethoxysilane,
vinyltriethoxysilane,
allyltriethoxysilane,
vinylmethyldimethoxysilane,
allylmethyldimethoxysilane,
allylmethyldiethoxysilane,
vinylmethyldiethoxysilane,
and mixtures thereof.

The grafting of the organic silane can be carried out on at least one of polymers (a) and (b) as defined above before mixing them with the remainder of the flame-retardant composition.

Preferably, the silane grafting is accomplished during compounding by adding the organic silane and the radical initiator to the other components of the flame-retardant composition. As initiator, an organic peroxide such as tert-butyl perbenzoate, dicumyl peroxide, benzoyl peroxide, di-tert-butyl peroxide, and the like, may be used. The compounding is carried out at a temperature predetermined so as to obtain the polymeric components in the molten state with a sufficient fluidity. Generally, the compounding temperature is from 180° C. to 320° C., preferably from 200° C. to 280° C.

The amount of organic silane to be added to the composition is predetermined so as to achieve in the final flame-retardant coating a good compatibilization between filler and polymeric components. On the other hand, an excess of organic silane is to be avoided, since it would cause a remarkable reduction of fluidity of the molten mixture during compounding. Generally, this result can be obtained by adding to the mixture an amount of organic silane of from 0.5 to 10 parts by weight, preferably from 1 to 5 parts by weight, with respect to 100 parts by weight of the polymer matrix. With these amounts of added silane, the quantity of radical initiator suitable to obtain grafting is generally of from 0.01 to 1, preferably from 0.02 to 0.5, parts by weight with respect to 100 parts by weight of the polymer matrix.

Alternatively, commercially available polyolefins grafted with organic silanes as defined above can be added to the polymer matrix to achieve the desired amount of silane groups in the final composition. Commercial products are, e.g., those known under the trademark Visico® by Borealis or Si-Link® by Union Carbide.

According to the present invention, with the term natural magnesium hydroxide it is meant magnesium hydroxide obtained by grinding minerals based on magnesium hydroxide, such as brucite and the like. Brucite is found in its pure form or, more often, in combination with other minerals such as calcite, aragonite, talc or magnesite, often in stratified form between silicate deposits, for instance in serpentine asbestos, in chlorite or in schists.

For the purposes of the present invention, brucite can be ground according to known techniques, under wet or dry conditions, preferably in the presence of grinding coadjuvants, for example polyglycols or the like. The specific surface of the ground product is generally between 5 and 20 m$^2$/g, preferably between 6 and 15 m$^2$/g. The magnesium hydroxide thus obtained can then be classified, for example by sieving, to obtain an average particle diameter generally of between 1 and 15 μm, preferably between 1.5 and 5 μm, and a particle size distribution such that not more than 10% of the total number of particles have a diameter lower than 1.5 μm, and not more than 10% of the total number of particles have a diameter greater than 20 μm.

Natural magnesium hydroxide generally contains various impurities derived from salts, oxides and/or hydroxides of other metals such as Fe, Mn, Ca, Si, V, etc. Amount and nature of the impurities can vary depending on the source of the starting mineral. The degree of purity is generally between 80 and 98% by weight. As regards water-soluble ionic-type impurities, their content can be determined indirectly by measuring electrical conductivity of an aqueous extract obtained by placing magnesium hydroxide in contact with a suitable amount of water for a predetermined period of time at a predetermined temperature. A more detailed description of this measurement, based on ISO method 787, is given hereinbelow. According to this method, electrical conductivity of the aqueous extract obtained from natural magnesium hydroxide is generally between 100 and 500 μS/cm, preferably between 120 and 350 μS/cm.

The natural magnesium hydroxide according to the present invention can be used as such or in the form of particles whose surface has been treated with saturated or unsaturated fatty acids containing from 8 to 24 carbon atoms, or metal salts thereof, such as, for example: oleic acid, palmitic acid, stearic acid, isostearic acid; lauric acid; magnesium or zinc stearate or oleate; and the like. To increase compatibility with the polymer matrix, natural magnesium hydroxide can also be surface-treated with suitable coupling agents, for example organic silanes or titanates such as vinyltriethoxysilane, vinyltriacetylsilane, tetraisopropyltitanate, tetra-n-butyltitanate, and the like.

Using Scanning Electron Microscopy (SEM), it has been observed that natural magnesium hydroxide has a highly irregular granular morphology in terms both of its geometrical shape and of its surface appearance. In contrast, the magnesium hydroxide obtained by precipitation consists of flattened hexagonal crystallites that are substantially uniform both in size and morphology.

As to component (a), ethylene homopolymers and copolymers of ethylene with an alpha-olefin may be selected from: high density polyethylene (HDPE) having a density of at least 0.940 g/cm$^3$, preferably of from 0.940 to 0.960 g/cm$^3$; medium density polyethylene (MDPE) having a density of from 0.926 to 0.940 g/cm$^3$; low density polyethylene (LDPE) and linear low density polyethylene (LLDPE) having a density of from 0.910 to 0.926 g/cm$^3$.

The above ethylene homopolymers and copolymers may be prepared according to well known techniques. More specifically, HDPE and MDPE may be prepared by a low to medium pressure ethylene homopolymerization in the presence of a Ziegler-Natta catalyst, giving rise to an ethylene homopolymer with a very low branching degree. LDPE is generally produced by a high-pressure process wherein ethylene is homopolymerized in the presence of oxygen or a peroxide as initiator, giving rise to long-branched polyethylene chains. LLDPE is a short-branched copolymer of ethylene with at least one alpha-olefin, generally having from 3 to 12 carbon atoms. LLDPE may be prepared according to known low-pressure processes in the presence of a Ziegler-Natta catalyst or a chromium-based catalyst. In LLDPE, the alpha-olefin is preferably 1-butene, 1-hexene or 1-octene, and is present in the copolymer in an amount of from 1 to 15% by moles.

As indicated above, the polymeric component (a) may comprise a copolymer of ethylene with an ethylenically unsaturated ester. Generally, they are copolymers of ethylene with at least one ester selected from: alkyl acrylates, alkyl methacrylates and vinyl carboxylates, wherein the alkyl group, linear or branched, may have from 1 to 8, preferably from 1 to 4, carbon atoms, while the carboxylate group, linear or branched, may have from 2 to 8, preferably from 2 to 5, carbon atoms. The amount of ester monomer in the copolymer may vary from 5 to 50% by weight, preferably from 15 to 40% by weight. Examples of acrylates and methacrylates are: ethyl acrylate, methyl acrylate, methyl methacrylate, tert-butyl acrylate, n-butyl acrylate, n-butyl methacrylate, 2-ethylhexyl acrylate, and the like. Examples of vinyl carboxylates are: vinyl acetate, vinyl propionate, vinyl butanoate, and the like.

The copolymers of ethylene with an ethylenically unsaturated ester can be produced according to known techniques, usually by high-pressure polymerization analogue to that described above for LDPE.

As regards the polymeric component (b), generally it is characterized by a narrow molecular weight distribution, with a Molecular Weight Distribution (MWD) index, defined as the ratio between the weight-average molecular weight $M_w$, and the number-average molecular weight $M_n$, of less than 5, preferably between 1.5 and 3.5. The MWD index can be determined, according to conventional methods, by Gel Permeation Chromatography (GPC).

In the polymeric component (b), with alpha-olefin it is meant an olefin of formula $CH_2$=CH—R, wherein R is a linear or branched alkyl having from 1 to 10 carbon atoms. The alpha-olefin can be selected, for example, from propylene, 1-butene, 1-pentene, 4-methyl-1-pentene, 1-hexene, 1-octene, 1-dodecene and the like. Among them, 1-butene, 1-hexene and 1-octene are particularly preferred.

When the alpha-olefin is propylene, the copolymers (b) are also characterized by high regioregularity in the sequence of monomer units. In particular, these copolymers have a number of —$CH_2$— groups in —$(CH_2)_n$— sequences, where n is an even integer, relative to the total number of —$CH_2$— groups, generally lower than 5% by mole, preferably lower than 1% by mole. This quantity can be determined according to known techniques by means of $^{13}$C-NMR analysis.

When a diene comonomer is present, it generally has from 4 to 20 carbon atoms, and is preferably selected from: linear, conjugated or non-conjugated diolefins, for example 1,3-butadiene, 1,4-hexadiene or 1,6-octadiene; monocyclic or polycyclic dienes, for example 1,4-cyclohexadiene, 5-ethylidene-2-norbornene, 5-methylene-2-norbornene, and the like.

Within the class of copolymers (b) as defined above, two main groups of products can be distinguished.

The first group (b1) consists of copolymers of ethylene with at least one $C_3$–$C_{12}$ alpha-olefin, and optionally a diene, these copolymers having elastomeric properties and preferably characterized by:

melting enthalpy lower than 35 J/g, preferably lower than 30 J/g;

intrinsic viscosity [η] generally greater than 1.25 dl/g, preferably greater than 3 dl/g (determined in tetralin at 135° C.);

solubility in pentane at 20° C. generally greater than 80% by weight;

tension set at 200% (measured at 20° C. for 1 minute according to ASTM standard D 412) lower than 30%.

Tension set provides a measure of the elastic recovery properties of the non-crosslinked material. This is determined by subjecting a sample of the tested material to a tensile force such as to obtain an elongation of 200% for a predetermined period. After removing the stress, the permanent deformation of the sample, which is expressed as a percentage relative to its initial dimensions, is measured: the smaller this value, the better the elastic properties of the material.

The copolymers belonging to group (b1) generally have the following composition: 35–90% by mole of ethylene; 10–65% by mole of alpha-olefin, preferably propylene; 0–10% by mole of a diene, preferably 1,4-hexadiene or 5-ethylidene-2-norbornene. When the alpha-olefin is propylene, the monomer composition is preferably as follows: 55–80% by weight, preferably 65–75% by weight, of ethylene; 20–45% by weight, preferably 25–35% by weight, of propylene; 0–10% by weight, preferably 0–5% by weight, of a diene (preferably 5-ethylene-2-norbornene). When the alpha-olefin is propylene, the propylene units are in the form of triads generally in amounts of between 4 and 50% by mole with respect to the total amount of propylene, and at least 70% of these triads have isotactic structure, as shown by $^{13}$C-NMR analysis.

The second group (b2) consists of copolymers of ethylene with at least one $C_4$–$C_{12}$ alpha-olefin, preferably 1-octene, and optionally a diene, preferably characterized by:

a density of between 0.860 and 0.904 g/cm$^3$;

a melting enthalpy of between 30 and 60 J/g;

Melt Flow Index (MFI), measured according to ASTM standard D 1238/L, of between 0.1 and 30 g/10 min, preferably between 0.5 and 5 g/10 min.

The copolymers belonging to group (b2) generally have the following composition: 75–97% by mole, preferably 90–95% by mole, of ethylene; 3–25% by mole, preferably 5–10% by mole, of alpha-olefin; 0–5% by mole, preferably 0–2% by mole, of a diene.

The copolymers (b) can be produced by copolymerization of ethylene with an alpha-olefin, and optionally with a diene, in the presence of a single-site catalyst, for example a metallocene catalyst, as described, e.g., in patent applications WO 93/19107 and EP-A-632,065 (for the copolymers of group (b1)) or in patents U.S. Pat. No. 5,246,783 and U.S. Pat. No. 5,272,236 (for the copolymers of group (b2)). The metallocenes used to polymerize the olefins are coordination complexes of a transition metal, usually of Group IV, in particular titanium, zirconium or hafnium, with two optionally substituted cyclopentadienyl ligands, used in combination with a co-catalyst, for example an alumoxane, preferably methylalumoxane, or a boron compound (see for example J. M. S.—Rev. Macromol. Chem. Phys., C34(3), 439–514 (1994); J. Organometallic Chemistry, 479 (1994), 1–29, or patents U.S. Pat. No. 5,272,236, U.S. Pat. No. 5,414,040 and U.S. Pat. No. 5,229,478, or the above-mentioned patent applications WO 93/19107 and EP-A-632065, and patents U.S. Pat. No. 5,246,783 and U.S. Pat. No. 5,272,236). Catalysts which are suitable for obtaining the copolymers (b) according to the present invention are also the so-called "Constrained Geometry Catalysts" described, for example, in patents EP-416,815 and EP-418,044.

The amount of natural magnesium hydroxide to be added to the flame-retardant composition according to the present invention is predetermined so as to obtain a LOI value of at least 30, preferably of at least 35, measured on compression moulded plates according to ASTM Standard D-2863.

Generally, the amount of magnesium hydroxide which is suitable for imparting the desired flame-retardant properties can vary within between 10 and 90% by weight, preferably between 50 and 90% by weight, with respect to the total weight of the composition.

The amount of the ethylene homopolymer or copolymer (a) is such that the flame-retardant coating obtained after extrusion has a value of thermocompression resistance, measured at 90° C. according to CEI standard 20-34/3-1, greater than 50%. The amount of the copolymer of ethylene with an alpha-olefin (b) is such that the flame-retardant coating obtained after extrusion has an elongation at break, measured according to CEI standard 20-34 § 5.1, of at least 100%, preferably of at least 130%, and a modulus at 20%, measured according to CEI standard 20-34 § 5.1, of less than 12 MPa, preferably less than 10 MPa.

Generally, for the purposes of the present invention, the desired mechanical and thermocompression resistance characteristics of the flame-retardant coating may be obtained using, as polymer matrix, a mixture comprising from 10 to 60% by weight, preferably from 15 to 45% by weight, of an ethylene homopolymer or copolymer (a), and from 40 to 90% by weight, preferably from 55 to 85% by weight, of a copolymer (b), the percentages being referred to the total weight of the polymeric components (a) and (b).

Other fillers with flame-retardant properties can optionally be added to the natural magnesium hydroxide, for example aluminium hydroxide or alumina trihydrate ($Al_2O_3 \cdot 3H_2O$). One or more inorganic oxides or salts such as CoO, $TiO_2$, $Sb_2O_3$, ZnO, $Fe_2O_3$, $CaCO_3$ or mixtures thereof can advantageously also be added in small amounts, generally less than 25% by weight.

Other conventional components such as antioxidants, processing coadjuvants, lubricants, pigments, other fillers and the like can be added to the compositions of the present invention.

Conventional antioxidants which are suitable for this purpose are, for example: polymerized trimethyldihydroquinoline, 4,4'-thiobis(3-methyl-6-tert-butyl)phenol; pentaerythritol tetrakis[3-(3,5-di-tert-butyl-4-hydroxyphenyl) propionate], 2,2'-thio-diethylene-bis-[3-(3, 5-di-tert-butyl-4-hydroxy-phenyl)propionate] and the like, or mixtures thereof.

Other fillers which may be used in the present invention include, for example, glass particles, glass fibres, calcined kaolin, talc and the like, or mixtures thereof. Processing co-adjuvants usually added to the polymer base are, for example, calcium stearate, zinc stearate, stearic acid, paraffin wax, silicone rubbers and the like, or mixtures thereof.

The flame-retardant compositions according to the present invention can be prepared by mixing the polymer components, the natural magnesium hydroxide, the silane compound, the radical initiator and other possible additives according to methods known in the art. The mixing can be carried out, for example, using an internal mixer of the type with tangential rotors (Banbury) or with interpenetrating rotors, or alternatively in continuous mixers such as those of the type Ko-Kneader (Buss), or of the type co-rotating or counter-rotating twin-screw.

As indicated above, the flame-retardant compositions according to the present invention do not show any appreciable cross-linking, therefore they behave as thermoplastic materials and thus are suitable to produce recyclable self-extinguishing coatings.

The flame-retardant compositions according to the present invention can be used to coat a conductor directly, or to make an outer sheath on a conductor previously coated with an insulating layer. This step can be carried out, for example, by extrusion. When two layers are present, the extrusion can be carried out in two separate stages, extruding the inner layer onto the conductor in a first run and the outer layer onto this inner layer in a second run. Advantageously, the coating process can be carried out in a single run, for example by means of a "tandem" method, in which two separate extruders arranged in series are used, or alternatively by co-extrusion using a single extrusion head.

FIG. 1 shows, in a schematic form, the cross-section of a low-voltage electrical cable of unipolar type according to one embodiment of the present invention, this cable comprising a conductor (1), an inner layer (2) acting as electrical insulation and an outer layer (3) acting as a protective sheath with flame-retardant properties, consisting of the composition according to the present invention.

The term "low voltage" is understood generally to refer to a voltage of less than 2 kV, preferably less than 1 kV.

The inner layer (2) may consist of a halogen-free, crosslinked or non-crosslinked polymer composition with electrically insulating properties which is known in the art, selected, e.g., from: polyolefins (homopolymers or copolymers of different olefins), olefin/ethylenically unsaturated ester copolymers, polyesters, polyethers, polyether/polyester copolymers, and mixtures thereof. Examples of such polymers are: polyethylene (PE), in particular linear low density PE (LLDPE); polypropylene (PP); propylene/ethylene thermoplastic copolymers; ethylene/propylene rubbers (EPR) or ethylene/propylene/diene rubbers (EPDM); natural rubbers; butyl rubbers; ethylene/vinylacetate (EVA) copolymers; ethylene/methylacrylate (EMA) copolymers; ethylene/ethylacrylate (EEA) copolymers; ethylene/butylacrylate (EBA) copolymers; ethylene/alpha-olefin copolymers, and the like. It is also possible to use the same polymer base for the inner layer (2) as well as for the outer layer (3), namely the mixture of (a) and (b) as defined above.

Alternatively, a self-extinguishing cable according to the present invention may consist of a conductor coated directly with the flame-retardant composition described above, without interposing other insulating layers. In this way, the flame-retardant coating also acts as electrical insulator. A thin polymer layer acting as an anti-abrasive can then be externally added, optionally supplemented with a suitable pigment to colour the cable for identification purposes.

The following working examples are given to illustrate the present invention more clearly.

As natural magnesium hydroxide, the commercial product Hydrofy® G-2.5 by SIMA was employed. It is an untreated magnesium hydroxide having the following characteristics:

TABLE 1

| Name | Type | Conductivity of the aqueous extract ($\mu$S/cm) | Specific surface ($m^2$/g) | Particle size curve ($\mu$m) | | |
|---|---|---|---|---|---|---|
| | | | | 10% | 50% (average) | 90% |
| Hydrofy® G-2.5 | natural | 135 | 8.2 | 0.5 | 2.6 | 9.8 |

The specific surface was measured by the BET method. The sample was previously subjected to a treatment under vacuum at a temperature of 130° C. for 24 hours to eliminate any adsorbed extraneous products, and then nitrogen was adsorbed (adsorption isotherm at –196° C., assuming an area of 16.2 $Å^2$ for the nitrogen molecule; apparatus used: Sorptomatic 1900—Carlo Erba).

The particle size distribution curve was obtained from suspensions of the sample of magnesium hydroxide in ethanol, using a helium-neon laser diffraction granulometer (Cilas-Alcatel Model HR850). The measurement was taken after ultrasonic treatment with stirring for 120 sec to ensure complete deflocculation of the test samples. The average particle diameter was obtained from the cumulative particle size distribution curves.

The content of water-soluble impurities was evaluated indirectly by measuring the conductivity of the aqueous extract, namely of an aqueous solution left in contact with the magnesium hydroxide for a predetermined period of time. In particular, the test was carried out in the following way.

20.0±0.1 g of magnesium hydroxide are suspended in 40 ml of ethanol with stirring. 160 ml of deionized water (conductivity of less than 1.5 $\mu$S/cm) are then added and the suspension is stirred using a magnetic stirrer for one hour. The suspension is subsequently filtered to separate out the magnesium hydroxide. A measurement of conductivity (A) is carried out on the resulting solution and is compared with the conductivity (B) of a solution consisting of 40 ml of ethanol in 160 ml of deionized water. The conductivity of the aqueous extract (C) is then calculated as:

$$C = A - B \qquad (\mu\text{S/cm}).$$

As regards the polymeric products, the reported properties were obtained as follows:
- second melting enthalpy ($\Delta H_{2m}$) and second melting point ($T_{2m}$): obtained by differential scanning calorimetry (DSC) with a scanning speed of 10° C./min;
- Melt Flow Index (MFI): measured according to ASTM standard D 1238/L (at 230° C. and 21.6 N for polypropylene, and at 190° C. and 21.6 N for ethylene/1-octene copolymers);
- Composition Distribution Index (CDI): determined by temperature rising elution fractionation method.

Preparation of the Flame-retardant Compositions.

The mixtures of the examples reported hereinbelow were prepared in a closed Banbury mixer (volume of the mixing chamber: 1200 cm$^3$) with a volume filling of 95%. The mixing was carried out at a temperature of 200° C. for a total time of 10 min (rotor speed: 44 revolutions/min).

Mechanical Properties.

Cable specimens were obtained by extruding the mixtures onto a single wire of red copper (section 1.5 mm$^2$; diameter: 1.4 mm) in an extruder with a cylinder having a 45 mm diameter and with a length equal to 25 diameters (final thickness of the insulating layer: 0.7 mm). On the so obtained cable coatings, mechanical tensile strength tests were performed according to CEI standard 20-34, § 5.1.

Measurement of Limited Oxygen Index (LOI).

The LOI was measured, according to ASTM Standard D 2863, on 3 mm thick plates obtained by compression moulding at 190–195° C. and 200 bar.

EXAMPLES 1–3 and 4–5 (Comparative)

The flame-retardant compositions were prepared as described above using as polymer matrix a mixture of an ethylene/1-octene copolymer (Engage® 8150—Du Pont-Dow Elastomers) obtained through metallocene catalysis, having a uniform distribution of the 1-octene comonomer between the copolymer molecules (CDI>70%), with a linear low density polyethylene (LLDPE) (Stamylex® 08-026—DMS) obtained by using a titanium Ziegler-Natta catalyst. The compositions, in phr, and the results of mechanical and LOI tests are reported in Table 2.

TABLE 2

| | EXAMPLE | | | | |
|---|---|---|---|---|---|
| | 1 | 2 | 3 | 4 (*) | 5 (*) |
| Engage ® 8150 | 70.00 | 70.00 | 70.00 | 70.00 | 70.00 |
| Stamylex ® 08-026 | 30.00 | 30.00 | 30.00 | 30.00 | 30.00 |
| Silane A-171 | — | — | 2.00 | — | — |
| Silane A-172 | 2.00 | 3.00 | — | — | — |
| Maleic anhydride | — | — | — | 0.15 | 0.10 |
| Peroximon ® DC 40 | 0.25 | 0.50 | 0.25 | 0.05 | 0.05 |
| Irganox ® 1010 | 0.80 | 0.80 | 0.80 | 0.80 | 0.80 |
| Hydrofy ® G-2.5 | 230.00 | 230.00 | 230.00 | 230.00 | 230.00 |
| Stearic acid | 1.50 | 1.50 | 1.50 | 1.50 | 1.50 |
| Total | 334.55 | 335.80 | 334.55 | 332.50 | 332.45 |
| Stress at break (MPa) | 10.8 | 14.9 | 12.1 | 17.1 | 11.1 |
| Elongation at break (%) | 185 | 140 | 165 | 90 | 105 |
| Modulus at 20% (MPa) | 9.1 | 10.9 | 9.8 | 13.1 | 9.9 |
| LOI (% O$_2$) | 36 | 36 | 36 | 36 | 36 |

(*) comparative
Engage ® 8150—ethylene/1-octene copolymer obtained by metallocene catalysis: ethylene/1-octene weight ratio = 75/25 (7.6% by mole of 1-octene); d = 0.868 g/cm$^3$; MFI = 0.5 g/10'; CDI > 70%; $\Delta H_{2m}$ = 34.4 J/g;
Stamylex ® 08-026—LLDPE obtained by titanium Ziegler-Natta catalyst: d = 0.911 g/cm$^3$; MFI = 2.2 g/10'; T$_{2m}$ = 123° C.;
Silane A-171: vinyltrimethoxysilane (VTMO);
Silane A-172: vinyl-tris(2-methoxyethoxy)silane (VTMOEO);
Peroximon® DC 40: dicumyl peroxide (radical initiator);
Irganox® 1010: pentaerythrityl-tetrakis[3-(3,5-di-tert-butyl-4-hydroxyphenyl)propionate] (antioxidant).

From the examples reported above, it clearly appears that, in the compositions according to the present invention, the use of the polyethylene-based polymer matrix grafted with organic silanes containing hydrolyzable groups instead of maleic anhydride allows to obtain an optimum balance of mechanical properties, wherein a good resistance to tensile stress (see the values of stress at break) is accompanied by excellent flexibility as shown by elongation at break and modulus values.

What is claimed is:

1. A self-extinguishing cable comprising a conductor and a flame-retardant coating, said flame-retardant coating comprising:
   (a) an ethylene homopolymer or copolymer having a density of from 0.905 to 0.970 g/cm$^3$, wherein said ethylene homopolymer or copolymer are: ethylene homopolymers; copolymers of ethylene with an alpha-olefin; copolymers of ethylene with an ethylenically unsaturated ester; or mixtures thereof;
   (b) a copolymer of ethylene with at least one alpha-olefin, and optionally with a diene, said copolymer (b) having a density of from 0.860 to 0.904 g/cm$^3$, and having a composition distribution index greater than 45%, said index being defined as the weight percentage of copolymer molecules having an alpha-olefin content within 5% of the average total molar content of alpha-olefin;
   (c) natural magnesium hydroxide in an amount such as to impart flame-retardant properties;
   wherein at least one of the polymeric components (a) and (b) contains hydrolyzable organic silane groups grafted onto the polymer chain for compatibilization of the natural magnesium hydroxide with the polymeric components;
   wherein said flame retardant coating has no appreciable cross-linking.

2. The cable according to claim 1, wherein the polymeric component (a) is high density polyethylene (HDPE) having a density of at least 0.940 g/cm$^3$; medium density polyethylene (MDPE) having a density of from 0.926 to 0.940 g/cm$^3$; low density polyethylene (LDPE) or linear low density polyethylene (LLDPE) having a density of from 0.910 to 0.926 g/cm$^3$; copolymers of ethylene with at least one ester, wherein said ester is an alkyl acrylate, alkyl methacrylate or vinyl carboxylate, wherein the alkyl group of said ester is linear or branched, has from 1 to 8 carbon atoms, while the carboxylate group of said ester is linear or branched, and has from 2 to 8 carbon atoms.

3. The cable according to claim 1, wherein the polymeric component (b) has a Molecular Weight Distribution (MWD) index of less than 5.

4. The cable according to claim 1, wherein the polymeric component (b) is produced by copolymerization of ethylene with an alpha-olefin, and optionally with a diene, in the presence of a single-site catalyst.

5. The cable according to claim 1, wherein the natural magnesium hydroxide is obtained by grinding a mineral based on magnesium hydroxide.

6. The cable according to claim 1, wherein the amount of natural magnesium hydroxide is predetermined so as to obtain a Limited Oxygen Index (LOI) value of at least 30, measured on compression moulded plates according to ASTM Standard D-2863.

7. The cable according to claim 1, wherein the amount of natural magnesium hydroxide is between 10 and 90% by weight with respect to the total weight of the composition.

8. The cable according to claim 1, wherein the amount of the ethylene homopolymer or copolymer (a) is such that the flame-retardant coating obtained after extrusion has a value of thermocompression resistance, measured at 90° C. according to CEI standard 20-34/3-1, greater than 50%.

9. The cable according to claim 1, wherein the amount of the copolymer of ethylene with an alpha-olefin (b) is such that the flame-retardant coating obtained after extrusion has an elongation at break, measured according to CEI standard 20-34 §5.1, of at least 100% and a modulus at 20%, measured according to CEI standard 20-34 §5.1, of less than 12 MPa.

10. The cable according to claim 1, wherein the flame-retardant coating comprises, as a polymer matrix, a mixture comprising from 10 to 60% by weight of an ethylene homopolymer or copolymer (a), and from 40 to 90% by weight of a copolymer (b), the percentages being referred to the total weight of the polymeric components (a) and (b).

11. The cable according to claim 1, wherein the hydrolyzable organic silane groups are grafted onto the polymer chain during compounding of the flame-retardant coating by aiding to the polymer mixture a radical initiator and an organic silane compound containing at least one hydrolyzable group and at least one ethylenically unsaturated hydrocarbon group.

12. The cable according to claim 11, wherein the organic silane is added to the mixture in an amount of from 0.5 to 10 parts by weight with respect to 100 parts by weight of the polymer matrix.

13. The cable according to claim 11, wherein the radical initiator is added to the mixture in an amount of from 0.01 to 1 part by weight with respect to 100 parts by weight of the polymer matrix.

14. A flame-retardant composition comprising:
 (a) an ethylene homopolymer or copolymer having a density of from 0.905 to 0.970 g/cm$^3$, wherein said ethylene homopolymer or copolymer are: ethylene homopolymers; copolymers of ethylene with an alpha-olefin; copolymers of ethylene with an ethylenically unsaturated ester; or mixtures thereof;
 (b) a copolymer of ethylene with at least one alpha-olefin, and optionally with a diene, said copolymer (b) having a density of from 0.860 to 0.904 g/cm$^3$, and having a composition distribution index greater than 45%, said index being defined as the weight percentage of copolymer molecules having an alpha-olefin content with 50% of the average total molar content of alpha-olefin;
 (c) natural magnesium hydroxide in an amount such as to impart flame-retardant properties;
 wherein at least one of the polymeric components (a) and (b) contains hydrolyzable organic silane groups grafted onto the polymer chain for compatibilization of the natural magnesium hydroxide with the polymeric components;
 wherein said flame retardant composition has no appreciable cross-linking.

15. A method for producing a self-extinguishing cable, said method comprising the following steps: (1) preparing a polymer mixture having flame-retardant properties; and (2) extruding said mixture on a conductor optionally pre-coated with an insulating layer, wherein step (1) comprises mixing a polymer matrix with a predetermined amount of natural magnesium hydroxide, and further adding to said polymer matrix a radical initiator and an organic silane compound containing at least one hydrolyzable group and at least one ethylenically unsaturated hydrocarbon group, in order to obtain grafting of hydrolyzable organic silane groups onto the polymer chains for compatibilization of the natural magnesium hydroxide with the polymeric matrix; said polymer matrix comprising:
 (a) an ethylene homopolymer or copolymer having a density of from 0.905 to 0.970 g/cm$^3$, wherein said ethylene homopolymer or copolymer are: ethylene homopolymers; copolymers of ethylene with an alpha-olefin; copolymers of ethylene with an ethylenically unsaturated ester; or mixtures thereof;
 (b) a copolymer of ethylene with at least one alpha-olefin, and optionally with a diene, said copolymer (b) having a density of from 0.860 o 0.904 g/cm$^3$, having a composition distribution index greater than 45%, said index being defined as the weight percentage of copolymer molecules having an alpha-olefin content with 50% of the average total molar content of alpha-olefin;
 wherein said flame retardant polymer mixture has no appreciable cross-linking.

* * * * *

UNITED STATES PATENT AND TRADEMARK OFFICE
CERTIFICATE OF CORRECTION

| | | |
|---|---|---|
| PATENT NO. | : 6,924,031 B2 | Page 1 of 1 |
| APPLICATION NO. | : 09/815311 | |
| DATED | : August 2, 2005 | |
| INVENTOR(S) | : Eduardo Grizante Redondo et al. | |

It is certified that error appears in the above-identified patent and that said Letters Patent is hereby corrected as shown below:

Title page, item (57), in the Abstract, line 4, "homopolymers:" should read --homopolymers;--.

\*   Claim 11, column 15, line 16, "aiding" should read --adding--.

Signed and Sealed this

Twenty-fifth Day of March, 2008

JON W. DUDAS
*Director of the United States Patent and Trademark Office*